United States Patent
Haneferd (10) Patent No.: US 10,955,083 B2
(45) Date of Patent: Mar. 23, 2021

(54) LAUNCHING PIPELINE PIGS

(71) Applicant: Subsea 7 Norway AS, Stavanger (NO)

(72) Inventor: Rasmus Haneferd, Hundvag (NO)

(73) Assignee: Subsea 7 Norway AS, Stavanger (NO)

(*) Notice: Subject to any disclaimer, the term of this patent is extended or adjusted under 35 U.S.C. 154(b) by 0 days.

(21) Appl. No.: 16/639,106

(22) PCT Filed: Aug. 21, 2018

(86) PCT No.: PCT/EP2018/072536
§ 371 (c)(1),
(2) Date: Feb. 13, 2020

(87) PCT Pub. No.: WO2019/038273
PCT Pub. Date: Feb. 28, 2019

(65) Prior Publication Data
US 2020/0208770 A1    Jul. 2, 2020

(30) Foreign Application Priority Data
Aug. 21, 2017    (GB) ..................... 1713412

(51) Int. Cl.
*F16L 55/46* (2006.01)
*B08B 9/055* (2006.01)

(52) U.S. Cl.
CPC .............. *F16L 55/46* (2013.01); *B08B 9/055* (2013.01)

(58) Field of Classification Search
CPC . F16L 55/46; F16L 55/26; F16L 55/28; B08B 9/055; B08B 9/0558
USPC ..................................... 15/104.062
See application file for complete search history.

(56) References Cited

U.S. PATENT DOCUMENTS

| | | | |
|---|---|---|---|
| 3,266,076 A | 8/1966 | Surber | |
| 4,011,620 A * | 3/1977 | Southgate | F16L 55/10 15/104.062 |
| 4,083,076 A * | 4/1978 | Girard | B08B 9/0553 15/104.061 |
| 5,208,936 A | 5/1993 | Campbell | |
| 6,022,421 A | 2/2000 | Bath et al. | |
| 8,296,894 B2 * | 10/2012 | Watson | F16L 55/46 15/104.062 |
| 2002/0117208 A1 | 8/2002 | Decker et al. | |
| 2002/0170599 A1 | 11/2002 | Disher et al. | |

(Continued)

FOREIGN PATENT DOCUMENTS

| | | |
|---|---|---|
| EP | 1 987 282 | 8/2007 |
| GB | 1 498 804 | 1/1978 |

(Continued)

*Primary Examiner* — Laura C Guidotti
(74) *Attorney, Agent, or Firm* — Levy & Grandinetti (57) ABSTRACT

A pipeline pig launching device has a tubular body that accommodates a set of pipeline pigs arranged in series, such that respective chambers art defined within the body in which to apply launch pressure behind each pig. The body has an open end through which pigs of the set may be launched in succession and a closed end opposed to the open end. A fluid inlet communicates with one of the chambers defined between the closed end and a pig nearest to that closed end. A passageway communicates with another fluid inlet that passageway extending through at least one pig to one or more other chambers defined between successive pigs of the set.

27 Claims, 3 Drawing Sheets

(56) References Cited

U.S. PATENT DOCUMENTS

2009/0083922 A1 4/2009 Watson et al.
2010/0132737 A1 6/2010 Mousa

FOREIGN PATENT DOCUMENTS

KR 10-1370132 3/2014
WO 2010/065478 6/2010

* cited by examiner

LAUNCHING PIPELINE PIGS

This invention relates to pipeline pigs, as are typically used for cleaning, flushing, dewatering, inspecting or pressure-testing a pipeline from within.

The invention relates particularly to the challenges of launching multiple pigs into a pipeline, and the problems suffered by traditional pig launchers in this respect. Those problems are heightened where pipelines are underwater, as in the offshore oil and gas industry in particular.

Pigs may have various shapes of circular cross-section, such as spheres, cylinders or dumbbells. Their outer diameter is selected to be substantially equal to the inner diameter of the pipeline in question. Thus, a pig is a close sliding or interference fit within and against the interior of the pipeline.

In use, pigs are injected into and propelled along a pipeline by fluid pressure. Specifically, a pressure differential is created within the pipeline between a volume ahead of the pig and a volume behind the pig, with respect to the intended direction of travel.

To maintain the necessary pressure differential, a pig has a series of annular or disc-shaped circumferential seals that separate the volume within the pipeline ahead of the pig from the volume within the pipeline behind the pig. The seals are suitably stiff enough to provide a scraping action so as to clean and flush the interior of the pipeline as the pig moves along the pipeline.

Bi-directional pigs can be shuttled along a pipeline in opposed reciprocal directions. Such pigs therefore have seals that are arranged to maintain adequate sealing contact with the interior of a pipeline irrespective of the direction of travel of the pig along the pipeline.

Most conveniently, the desired pressure differential is created by introducing high-pressure fluid through a pressure inlet into a volume behind the pig, initially within a launching apparatus and then, after injection, within the pipeline.

Pigs are typically launched into a pipeline from a pig launcher or trap that propels the pigs into and along the pipeline with the relevant pressure differential. A pig launcher comprises a pipe section defining a chamber for housing one or more pigs. That chamber is supplied with high-pressure fluid through one or more pressure inlets controlled by valves. The chamber communicates with the interior of the pipeline through an access opening that may be disposed at an end of the pipeline or anywhere along the length of the pipeline.

Where there is only one pig, a pig launcher can be quite simple because only one pressure inlet is needed behind the pig to propel it into the pipeline. Thus, a pig launcher containing only one pig can be compact and have simple piping and valve arrangements. However, such a pig launcher must be reloaded with another pig after each pig is launched. This requires repeatedly opening an end cap of the pig launcher, which may contain pressurised fluid, and so is disadvantageous for subsea use.

For this reason, it is desirable for a pig launcher to contain two or more pigs and to make provision for those pigs to be launched successively and separately into and along a pipeline when required. U.S. Pat. No. 6,022,421 discloses an example of a multiple pig launcher, which comprises a pipe section that holds a succession or train of pigs in series and is supplied with high-pressure fluid through various valves and pressure inlets. Another multiple pig launcher arrangement is shown in US 2002/117208, in which a network of valves and kicker lines are used to divert production fluid to launch pigs held in a cartridge. U.S. Pat. No. 3,266,076 also describes an early multiple pig launcher for launching a series of pigs, in which chambers defined behind each pig have respective fluid inlets.

Multiple pig launchers are complex, bulky and expensive, not least because each pig may require its own longitudinally-spaced inlet for high-pressure fluid. Consequently, a multiple pig launcher is generally removed from a pipeline after use to enable it to be re-used elsewhere. Another reason for removing and recovering a pig launcher from a subsea pipeline is that ensuring safe and reliable operation of a pig launcher left underwater for the entire life of the pipeline, which is typically in excess of twenty years, would require extremely stringent and expensive design parameters. This is impractical for equipment that requires only intermittent use.

Removing a pig launcher from a subsea pipeline requires the great expense of additional vessel intervention on site. Additionally, its removal involves properly sealing the access opening that communicates with the interior of the pipeline.

US 2002/170599 teaches how a multiple pig launcher can be made more compact by using a rotary pig magazine. However as that design is complex and relies upon gravity to drop pigs successively into a pipeline, it may be unreliable. Also, the design is not suitable for subsea use. Even if the design was adapted for subsea use, it would still be necessary to remove the pig launcher from a subsea pipeline after use.

GB 1498804 discloses a pig launcher for launching spherical pigs. Pressurised fluid is directed between two such pigs to launch a first pig and then behind a second pig to launch the second pig. For this purpose, the second pig is contained within a sleeve within the launcher pipe, which requires that pig, at least, to be compressible to the substantial extent necessary to fit into the sleeve. Aside from that restriction, the arrangement disclosed in GB 1498804 cannot readily be adapted to accommodate more than two pigs.

EP 1987282 discloses a simplified pig-launching system in which a multiple pig launcher contains an in-line train or series of pigs abutting end-to-end but only has one fluid inlet. To achieve this, each pig of the series contains a central tube that extends axially along the full length of the pig. Thus, the tubes of successive pigs cooperate to form a central pipe or duct that extends through and along the series.

Each pig of EP 1987282 has a valve at a leading end, which valve is capable of closing the tube of that pig, and a hollow protrusion at a trailing end aligned with and communicating with the tube. When the pigs abut with their neighbours in series, the protrusion of each pig holds open the valve of the pig immediately behind. This allows the first pig at a leading end of the series to be launched by applying a burst of elevated fluid pressure through the central duct formed by the successive tubes of the pigs. When the first pig has been launched, the valve in the second pig closes under spring bias to allow the second pig to be launched, in turn, by applying a further burst of elevated fluid pressure through the duct.

Whilst simple in principle, the system disclosed in EP 1987282 suffers drawbacks that add complexity in practice. For example, the risk that pigs could be launched inadvertently requires an additional remotely-controlled system to hold a valve of a pig open until that pig is to be launched. The complexity and expense of such a system is undesirable, particularly in an industry that regards pigs as consumable items.

WO 2010/065478 discloses a dumbbell-type pig in which a flow passage defined within a central tubular shaft can be closed by a valve. The valve is normally closed to enable a pressure differential to drive the pig during launching and along the pipeline. However if the pig encounters an obstacle in the pipeline that blocks progress of the pig, the valve may be opened to apply extra pressure and fluid flow through the flow passage ahead of the pig to clear the obstacle. No solution is proposed to the problem of launching multiple pigs as simply as possible.

Against this background, the present invention resides in a pipeline pig launcher or launching device comprising a tubular body that accommodates a set of pipeline pigs arranged in series such that respective chambers are defined within the body in which to apply launch pressure behind each pig with respect to a launch direction. The body has an open end through which pigs of the set may be launched in succession and a closed end opposed to the open end. A fluid inlet communicates with one of the chambers defined between the closed end and a pig of the set nearest to that closed end. A passageway communicates with another fluid inlet, that passageway extending through at least one pig of the set to at least one of the chambers defined between successive pigs of the set.

Preferably, the fluid inlets penetrate a wall of the body and more preferably are disposed in or within the closed end of the body.

Each fluid inlet suitably has a respective individually-controllable valve for controlling fluid flow through that inlet.

The closed end of the body may be defined by a closure that is movable or removable for loading the set of pigs into the body.

In some embodiments of the invention, the passageway may be defined by a tubular member that extends from the fluid inlet through a bore that penetrates at least one pig of the set longitudinally. In that case, at least one valve element is conveniently arranged to be held in an open state by the tubular member and to move into a closed state to close the bore on disengagement of the pig from the tubular member. For example, the or each valve element may close an end of the bore when in the closed state.

Preferably, the bore is a sliding fit around the tubular member, in which case at least one sliding seal may act between the bore and the tubular member.

In other embodiments of the invention, the passageway may comprise at least two conduit portions or parts, at least one of those parts extending through a pig of the set and being separable from another conduit part upon launching that pig. In those embodiments, the passageway may comprise a valve arranged to be held open by engagement of the conduit parts and to close on disengagement of the conduit parts, hence to close the passageway on separation of the conduit parts.

More generally, a movable valve element of a pig of the set may be engageable to be held in an open state by a holding element of a neighbouring pig of the set.

Advantageously, at least one retaining element may extend between successive pigs of the set to act in tension between those pigs. The retaining element, or its connection to at least one of the successive pigs, may be breakable in response to the application of launch pressure to a chamber defined between those pigs.

A passageway extending through a pig may comprise a pressure-responsive valve that is arranged to be in an open state under launch pressure to permit fluid flow through the passageway and to be in a closed state under operational pressure of the pig to block fluid flow through the passageway.

A further passageway may communicate with a respective further fluid inlet, the further passageway extending through at least two pigs of the set to at least one of said chambers defined between successive pigs of the set. Broadly, the arrangement may include respective passageways extending through one or more pigs to each chamber defined between each pair of pigs of the set, each passageway communicating with a respective fluid inlet.

The inventive concept embraces a corresponding method of launching pipeline pigs from a set of such pigs arranged in series within a tubular body, such that respective chambers are defined within the body in which to apply launch pressure behind each pig with respect to a launch direction. The method comprises applying launch pressure to at least one of the pigs by introducing fluid through a fluid inlet and from that inlet through at least one other pig of the set to at least one of the chambers between successive pigs of the set. The method further comprises applying launch pressure to a pig of the set nearest to a closed end of the body by introducing fluid through another fluid inlet into one of the chambers between that pig and the closed end of the body.

The fluid inlets suitably introduce fluid into the body through a wall of the body such as the closed end of the body. The flow of fluid through each inlet may be controlled independently.

In some embodiments, fluid may be introduced to a chamber between successive pigs via a tubular member extending along a bore through a pig. The tubular member may hold open a valve element that is capable of closing the bore through that pig. Thus, the valve element may be allowed to close that bore upon disengaging that pig from the tubular member.

In another approach, fluid may be introduced into a chamber between successive pigs via a passageway that comprises at least two conduit parts, at least one of those conduit parts fixed to, incorporated in or otherwise associated with a pig separating from another conduit part upon launching that pig. A valve in the passageway may be held open by virtue of mutual engagement of the conduit parts, whereupon the valve may be allowed to close the passageway on mutual separation of the conduit parts.

Retaining force may be applied between opposed ends of successive pigs of the set, to be overcome by increasing pressure in a chamber between the successive pigs.

In summary, the invention replaces a pig launcher with a launching cap that has simplified piping. This requires a modification in the design of at least some pigs, namely to include a traversing channel for a flow of fluid to propel one or more previous pigs in a train or series. The channels are automatically closed after separation of the previous pig, for example by a valve or flap with a loaded spring that closes when pressure drops or when separation triggers or enables a mechanical action driven by the spring. There can be a minimum of one valve or flap, but two or more may be necessary in a bi-directional pig to allow for reversal of motion.

Embodiments of the invention provide a pig launching system for launching at least two distinct pigs into a pipeline. That system comprises an end cap hermetically sealing an end of the pipeline. At least one pig comprises at least one longitudinally traversing bore and at least one mechanism for closing that bore. The end cap comprises at least one port and piping for injecting pressurised fluid through the longitudinally traversing bore into a chamber between said at least one pig and a second pig, in addition to piping for injecting pressurised fluid into a chamber between said at least one pig and the end cap.

Each pig in a train or series of pigs may comprise at least as many traversing bores as the number of preceding pigs, those bores having at least one closing mechanism. Preferably each of those bores have a respective closing mechanism for closing the bore.

The or each closing mechanism may be activated automatically in various ways, examples being: by separation of the previous pig in the pig train; by a pressure drop; and/or by separation of a pig from a pipe, hose or sock that is removably inserted into the traversing bore.

The or each closing means may comprise a spring-loaded flap. Two closing means may be arranged symmetrically at each end of a traversing bore.

The end cap may comprise one inlet per traversing bore, each inlet being in fluid communication with a respective traversing bore, plus at least one extra inlet for propelling the last pig in the train or series. Piping associated with each inlet may comprise a valve.

A particular method of the invention for launching at least two pigs into a pipeline comprises: inserting a first pig into a pipeline end; inserting at least a second pig into the same pipeline end, at least the second pig comprising at least one longitudinally traversing bore and at least one mechanism for closing that bore; closing the pipeline end by an end cap; launching the first pig by injecting a pressurised fluid through the end cap into the traversing bore of the second pig; closing the traversing bore; and launching the second pig by injecting a pressurised fluid through the end cap into a chamber defined by the pipeline end, the end cap and the second pig.

Thus, the end cap suitably comprises at least one inlet in fluid communication with the traversing bore of the second pig and at least one inlet in fluid communication with the chamber. The bore may be closed by triggering the closing mechanism automatically.

In order that the invention may be more readily understood, reference will now be made, by way of example, to the accompanying drawings in which.

Figure 1A:
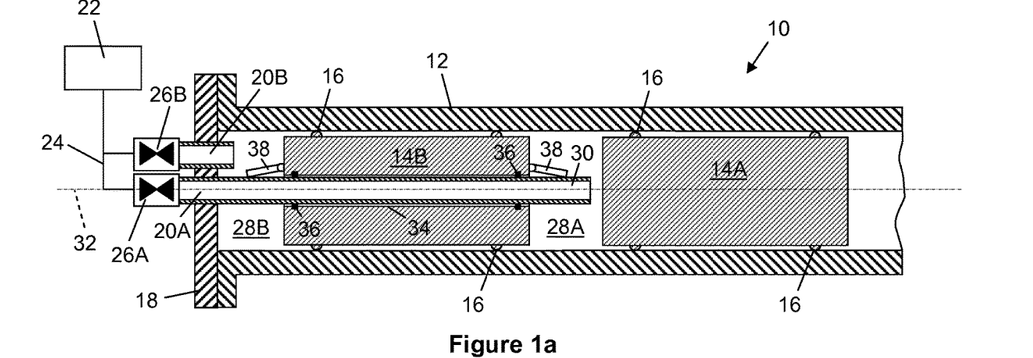
FIGS. 1a, 1b and 1c are a sequence of schematic part-sectional side views of a subsea pig launcher in accordance with a first embodiment of the invention, launching two pipeline pigs in succession.
Figure 1B:
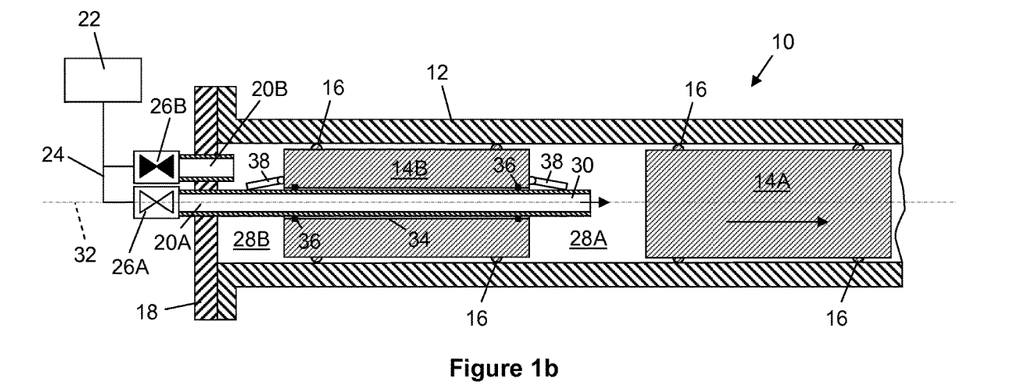
Figure 1C:
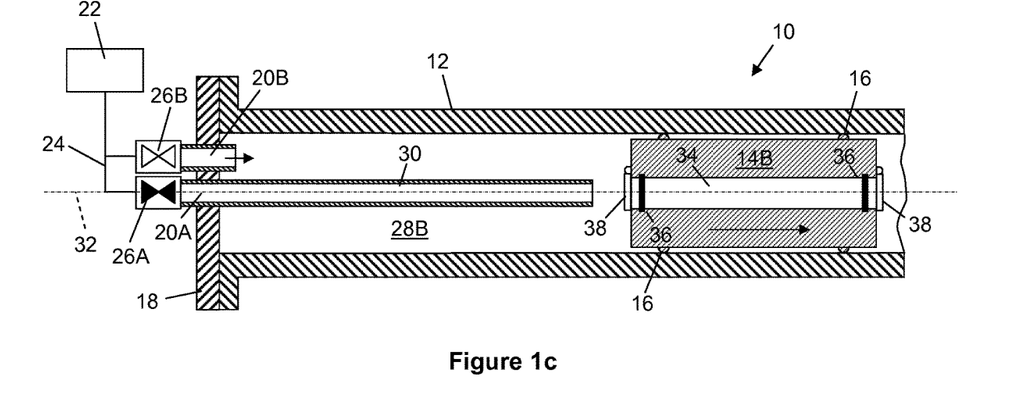

Referring firstly to the first embodiment of the invention shown in FIG. 1 of the drawings, a subsea pig launching device 10 comprises a pipe section defining an elongate tubular body 12 of circular cross-section. For simplicity, the body 12 is shown here as being substantially straight along its length but it could instead be curved along its length.

The body 12 contains a set of pipeline pigs 14 disposed end-to-end in series. In this case, for simplicity, the set comprises just two pigs 14, namely a first pig 14A that is positioned ahead of a rearmost second pig 14B, having regard to a launch direction from left to right as illustrated.

The pigs 14 are exemplified here as being of cylindrical outer shape. Other shapes of pigs are possible, such as spheres, ellipsoids or dumbbells, provided that they are of circular cross-section to fit closely within the body 12.

As is conventional, the pigs 14 shown here are provided with longitudinally-spaced resiliently-conformable circumferential outer seals 16 whose overall diameter is selected to be a close sliding or interference fit with the internal surface of the body 12.

One end of the body 12, to the right as illustrated, is open for communication with the interior of a subsea pipeline into which the pigs 14 are to be launched successively in the launch direction. The body 12 may be an end portion of the pipeline itself, hence in general alignment with the remainder of the pipeline, or may intersect the pipeline so that the pigs 14 enter the pipeline through an opening in a side wall of the pipeline. Both arrangements are conventional and so require no further elaboration here.

The other end of the body 12, to the left as illustrated, is closed and sealed by a closure that is exemplified here by an end cap 18. The end cap 18 is penetrated by fluid inlets 20 to admit high-pressure fluid into the interior of the body 12. The fluid suitably flows from a common source 22 to first and second inlets 20A, 20B along pipework such as a branched manifold 24 as shown. Fluid flow through each inlet 20 is controlled by respective valves 26A, 26B, one on each branch of the manifold 24. Other pipework arrangements are possible, such as direct connection of the inlets 20 and the associated valves 26 to the source 22 via respective separate pipes.

As is conventional, open valves 26 are shown in the drawings as white and closed valves 26 are shown as black.

The end cap 18 is suitably movable or removable from the associated end of the body 12 to allow access through that end to the interior of the body 12. This allows the body 12 to be reloaded with a fresh set of pipeline pigs 14 if and when required. Thus, the manifold 24 or other external pipework may comprise flexible or otherwise movable or detachable pipes or hoses to allow the end cap 18 to be moved relative to the body 12.

When the system is in a standby or ready state as shown in FIG. 1a, there is a longitudinal space or gap between the first and second pigs 14A, 14B and another such gap between the second pig 14B and the end cap 18. Those gaps correspond to chambers 28 within the body 12, respectively, a first chamber 28A and a second chamber 28B. More specifically, the first chamber 28A is defined between adjacent outer seals 16 of the first and second pigs 14A, 14B and the surrounding body 12 of the device 10. The second chamber 28B is defined between a rearmost outer seal 16 of the second pig 14B, the surrounding body 12 and the end cap 18 that closes an end of the body 12.

The first inlet 20A communicates with the first chamber 28A through a pipe 30 that extends longitudinally from the end cap 18 along the interior of the body 12. The pipe 30 is substantially parallel to the tubular wall of the body 12 and hence to the central longitudinal axis 32 of the body 12. The pipe 30 is shown here disposed concentrically with respect to the central longitudinal axis 32 of the body 12 but this positioning is optional, as the pipe 30 could be offset laterally within the body 12 in principle. Conversely, the second inlet 20B communicates directly with the second chamber 28B.

It will be apparent from FIGS. 1a and 1b that to reach the first chamber 28A behind the first pig 14A, the pipe 30 extends longitudinally through the second chamber 28B and the interior of the second pig 14B. For this purpose, the pipe 30 fits telescopically within a longitudinal bore 34 of the second pig 14B, aligned concentrically with the pipe 30. Thus, the bore 34 is also centered on the central longitudinal axis 32 of the body 12 in this example.

The bore 34 opens to each end of the second pig 14B and hence communicates with the first and second chambers 28A, 28B. To maintain fluid pressure in those chambers 28 and to seal or partition one chamber 28 from the other, the bore 34 contains longitudinally-spaced internal circumferential seals 36 that are a close sliding fit around the pipe 30.

In the standby or ready state shown in FIG. 1a, the first and second valves 26A, 26B are held closed. When the first pig 14A is to be launched as shown in FIG. 1b, the first valve 26A is opened to admit high-pressure fluid through the first inlet 20A. The second valve 26B remains closed. The fluid flows along the pipe 30 and into the first chamber 28A behind the first pig 14A. The resulting overpressure in the first chamber 28A propels the first pig 14A in the launch direction.

When the second pig 14B is to be launched, the second valve 26B is opened as shown in FIG. 1c to admit high-pressure fluid through the second inlet 20B. That fluid flows into the second chamber 28B behind the second pig 14B. The resulting overpressure in the second chamber 28B propels the second pig 14B in the launch direction. In doing so, the second pig 14B slides telescopically along the pipe 30 until the bore 34 slides off the free end of the pipe 30.

The first valve 26A is shown in FIG. 1c as being closed when launching the second pig 14B. This demonstrates that opening the second valve 26B alone is sufficient to launch the second pig 14B. However it would be possible for the first and second valves 26A, 26B to be open together when launching the second pig 14B, as fluid admitted through the first valve 26A may add impetus to the second pig 14B.

To maintain the pressure differential required for its propulsion along the pipeline, the second pig 14B comprises a pig valve system that is capable of closing the bore 34 when the second pig 14B has been launched. The pig valve system is required to close the bore 34 when the bore 34 is no longer blocked by the pipe 30.

The pig valve system may take various forms but is implemented here by simple flap valves 38 acting respectively on leading and trailing ends of the bore 34 with respect to the launch direction. Each flap valve 38 is hinged about a hinge axis orthogonal to the launch direction so as to be movable between open and closed positions. In the open position, each flap valve 38 lies clear of the associated end of the bore 34 whereas in the closed position, each flap valve 38 covers and seals around the associated end of the bore 34.

Conveniently, the flap valves 38 are held open by the pipe 30 when the pipe 30 extends along and protrudes from the bore 34, as shown in FIGS. 1a and 1b. The flap valves 38 are suitably biased shut, for example by respective springs coiled around the hinge axes, to move into the closed position when freed to do so as shown in FIG. 1c.

Two flap valves 38 acting in opposition are shown here to confer bi-directional functionality upon the second pig 14B. However, if the second pig 14B is to be propelled in only the launch direction, one of the flap valves 38 could be omitted, preferably to leave only the flap valve 38 on a trailing end of the bore 34. In this respect, it will be noted that overpressure behind the second pig 14B will tend to urge a trailing-end flap valve 38 into the closed position.

It may be possible to have only a single flap valve 38 on the leading end of the bore 34 if the flap valve 38 is biased into the closed position with sufficient bias force to resist overpressure that tends to force the flap valve 38 open, or if the flap valve 38 is otherwise held in the closed position. Indeed, such a flap valve 38 could permit bi-directional operation if positioned on either end of the bore 34.

The second embodiment shown in FIGS. 2a to 2d shows how the working principle described for the first embodiment above could be adapted into other specific forms. Indeed, in this example, the working principle is extended to provide for more than two pigs, exemplified here by a set of three pigs 14A, 14B and 14C to be launched by a subsea pig launcher 40. Like numerals are used for like features.

Figure 2A:
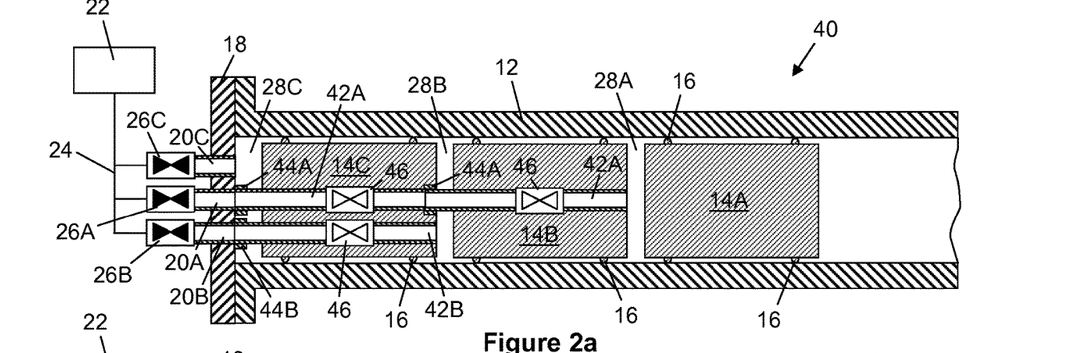
FIGS. 2a, 2b, 2c and 2d are a sequence of schematic part-sectional side views of a subsea pig launcher in accordance with a second embodiment of the invention, launching three pipeline pigs in succession.

In this second embodiment, the pipe 30 that extends forwardly from the end cap 18 in the first embodiment is replaced by a conduit comprising one or more bores or conduit portions such as pipes 42 that extend through, and are integral with or fixed to, one or more of the pigs 14. Thus, pipes 42 of the second and third pigs 14B, 14C engaged end-to-end are separable from each other as the second pig 14B is launched, and pipes 42 of the third pig 14C are separable from the end cap 18 as the third pig 14C is launched.

Specifically, the first chamber 28A between the first and second pigs 14A, 14B communicates with the first inlet 20A in the end cap 18 via first pipes 42A engaged end-to-end. The first pipes 42A extend through, and are fixed to, each of the second and third pigs 14B, 14C in mutual alignment with each other and also in alignment with the first inlet 20A.

Coupling formations are provided between the first pipes 42A of the second and third pigs 14A, 14B and between the first pipe 42A of the third pig 14C and the end cap 18. In this example, the coupling formations comprise forwardly-facing sockets 44A that sealingly receive complementary rearwardly-projecting ends of the first pipes 42A. Thus, one of the sockets 44A is provided on a forward or leading end face of the third pig 14C and the other socket 44A is provided on an inner face of the end cap 18, communicating with the first inlet 20A.

Similarly, the second chamber 28B between the second and third pigs 14B, 14C communicates with the second inlet 20B in the end cap 18 via a second pipe 42B that extends through, and is fixed to, the third pig 14C in alignment with the second inlet 20B. The second pipe 42B is substantially parallel to the first pipe 42A of the third pig 14C.

Again, coupling formations are provided between the second pipe 42B of the third pig 14C and the end cap 18. Those coupling formations comprise a forwardly-facing socket 44B provided on an inner face of the end cap 18 that communicates with the second inlet 20B. A complementary rearwardly-projecting end of the second pipe 42B is sealingly received in the socket 44B.

A third inlet 20C in the end cap 18 communicates directly with a third chamber 28C between the third, rearmost pig 14C and the end cap 18.

Figure 2B:
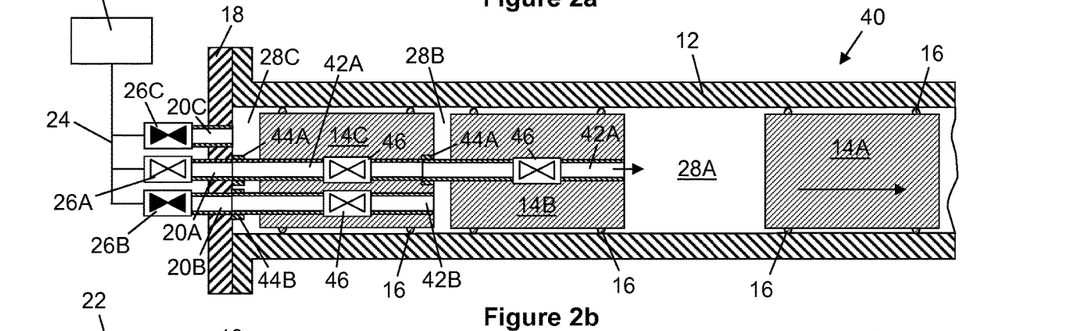
Figure 2C:
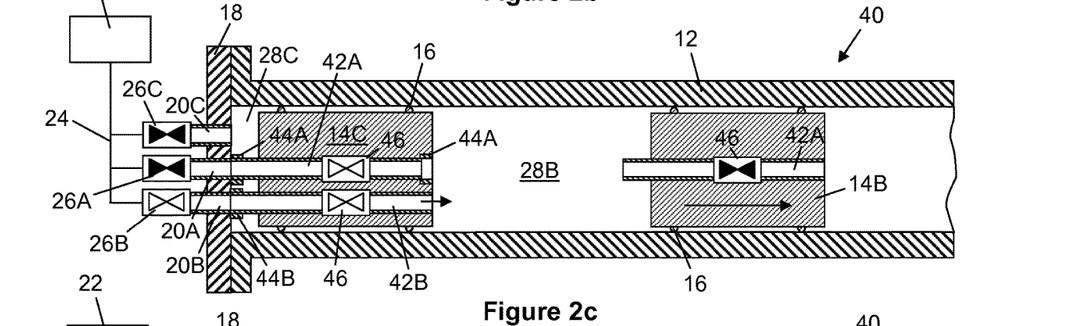

FIG. 2a shows the pig launcher 40 in a standby or rest state, with all three pigs 14 held stationary end-to-end within the body 12. When it is desired to launch the first pig 14A, the first valve 26A is opened as shown in FIG. 2b to apply fluid overpressure to the first chamber 28A via the first inlet 20A and the first pipe 42A. Similarly, when it is desired to launch the second pig 14B, the second valve 26B is opened as shown in FIG. 2c to apply fluid overpressure to the second chamber 28B via the second inlet 20B and the second pipe 42B. Finally, the third pig 14C can be launched as shown in FIG. 2d by opening the third valve 26C to apply fluid overpressure through the third inlet 20C of the end cap 18 communicating directly with the third chamber 28C.

Figure 2D:
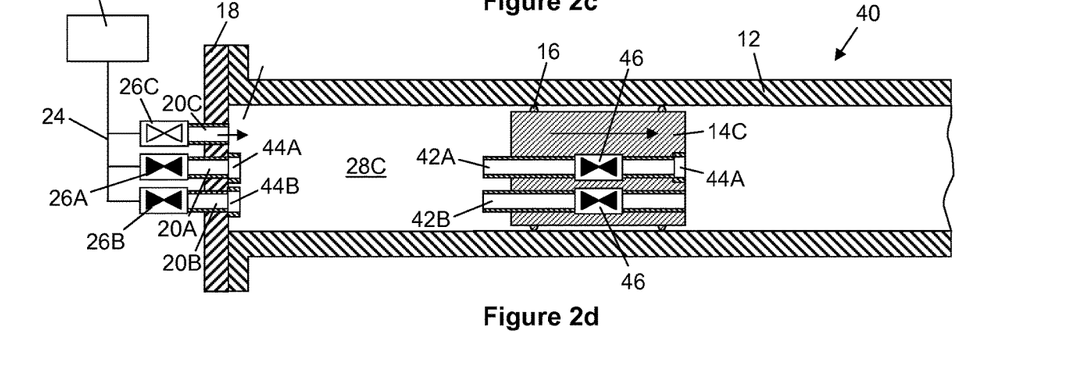

As in the first embodiment, previously-opened valves 26 are shown as closed in FIGS. 2c and 2d but could be left open, as fluid admitted through those valves 26 may add impetus to the second and third pigs 14B, 14C.

Like the second pig 14C in the first embodiment, each of the second and third pigs 14B, 14C in the second embodiment is provided with respective pig valve systems 46. However, those pig valve systems 46 are shown here schematically to emphasise that they may take various forms. The pig valve systems 46 close the first and second pipes 42A, 42B before, during or shortly after launch of the associated pigs 14 to allow those pigs 14 to be propelled thereafter by differential pressure in the pipeline. For example, the pig valve systems 46 may be arranged to respond differently to different fluid pressures experienced during launch and in use of a pig 14. Specifically, the pig valve systems 46 may open under launching pressure to allow fluid to flow through the pipes 42A, 42B on launching a pig 14 and may close under operational pressure to block fluid flow through the pipes 42A, 42B when a pig 14 has been launched and is in use.

Figure 3A:
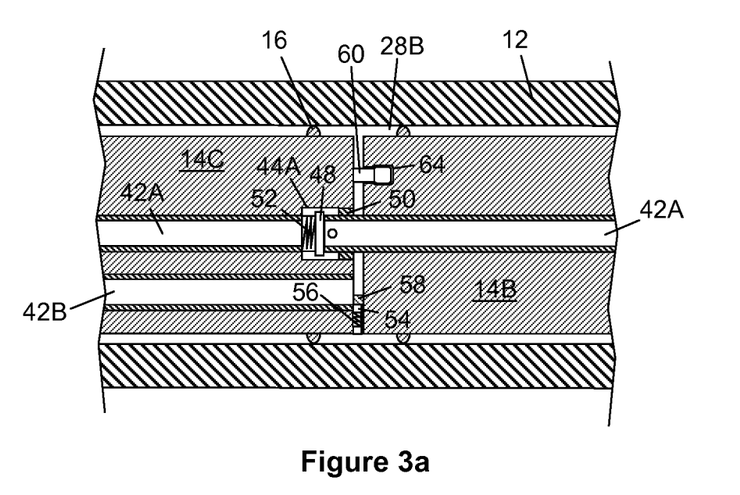
FIGS. 3a and 3b are enlarged schematic part-sectional side views showing details of possible variants of the second embodiment of the invention.
Figure 3B:
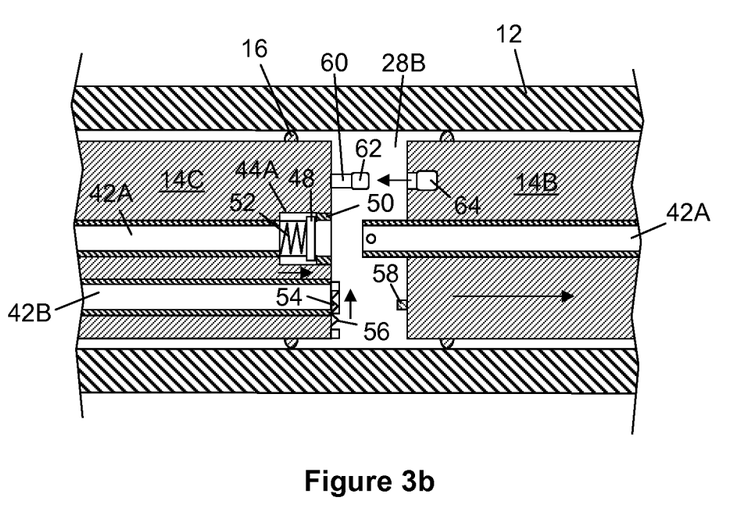

Turning finally to FIGS. 3a and 3b, these drawings show optional details of a possible variant of the second embodiment. The features shown in those drawings could be applied also to the first embodiment.

Firstly, FIGS. 3a and 3b show other possible arrangements for the pig valve system that is shown schematically in FIGS. 2a to 2d. In these examples, a movable valve element on one pig 14 is engaged and held open by a holding element on a neighbouring pig 14.

The underlying principle here is that the holding element holds the valve element in an open position relative to the associated pig 14 while the neighbouring pigs 14 remain together. This keeps the associated conduit open to allow high-pressure fluid to flow along the conduit when launching a pig 14 as described above. As the pigs 14 move apart when one of the pigs 14 is being launched, however, the holding element disengages from the valve element. This allows the valve element to move into a closed position relative to the associated pig 14, hence closing the conduit in that pig 14. For this purpose, the valve element is conveniently biased into the closed position to shut the conduit in the absence of the holding element of the neighbouring pig 14.

In one example embodying this principle, the valve element is a plunger 48 that is disposed within the socket 44A at the front or forward end of the first pipe 42A of the third pig 14C. Conversely, the holding element is a complementary rearwardly-protruding end of the first pipe 42A of the second pig 14B.

When the first pipes 42A of the second and third pigs 14B, 14C engage end-to-end via the socket 44A to complete a conduit as shown in FIG. 3a, the protruding end of the first pipe 42A of the second pig 14B depresses the plunger 48 for as long as the second and third pigs 14B, 14C remain together. This holds the plunger 48 clear of a seat formation 50, against the bias of a spring 52 behind the plunger 48 to allow high-pressure fluid to flow along the conjoined first pipes 42A.

When the second pig 14B is being launched as shown in FIG. 3b, the first pipe 42A of the second pig 14B disengages from the socket 44A. Thus, the protruding end of that pipe 42A no longer depresses the plunger 48, which snaps forward onto the seat formation 50 under the bias of the spring 52. This substantially prevents further flow of fluid along the first pipe 42A of the third pig 14C, facilitating subsequent launch and propulsion of the third pig 14C.

It will be apparent that the leading end of the second pig 14B could have a corresponding valve arrangement that, similarly, previously closed the first pipe 42A of the second pig 14B upon launching the first pig 14A.

FIGS. 3a and 3b show another possible pig valve system, being another example embodying the aforementioned principle. This variant is applied here to the front or forward end of the second pipe 42B that extends through the third pig 14C. However like the other pig valve systems 48, it could in principle be used to close a bore or pipe in any of the pigs 14.

In this instance, the valve element is a shutter 54 that is movable relative to the third pig 14C to close the second pipe 42B of the third pig 14C. The shutter 54 is shown in an open position in FIG. 3a and in a closed position in FIG. 3b. Preferably a spring 56 biases the shutter 54 into the closed position as shown.

Here, the holding element is a latch formation 58 that protrudes from a trailing end of the second pig 14B. The latch formation 58 engages the shutter 54 to hold it open against the bias of the spring 56 for as long as the second and third pigs 14B, 14C remain together as shown in FIG. 3a. However, when the second pig 14B is being launched as shown in FIG. 3b, the latch formation 58 disengages from the shutter 54 to allow the shutter 54 to snap shut under the bias of the spring 56. This closes the second pipe 42B to prepare the third pig 14C for its subsequent launch.

The shutter 54 can move relative to the third pig 14C in various ways. For example, the shutter 54 can move transversely or orthogonally relative to the launch direction as shown, sliding in translation or turning about a pivot axis that is generally parallel to the launch direction. Alternatively the shutter 54 could be hinged like the flap valves 38 of the first embodiment.

FIGS. 3a and 3b also show one of various ways in which adjacent pigs 14 can be held together until they are forced apart by high-pressure fluid acting between them when one of them is to be launched. The principle here is that a retaining element extending between the neighbouring pigs 14 acts in tension to hold the pigs 14 together temporarily. This keeps the valve elements and the holding elements in mutual engagement and so maintains the integrity of conduits that extend between the pigs 14. The retaining element continues to do so until that element, or its connection to at least one of the pigs 14, is broken as a result of elevated pressure in the chamber 28B between the pigs 14 upon launching.

In this example, the retaining element is embodied by a resilient stud 60 that projects from an end of one of the pigs 14, in this case the leading end of the third pig 14C. The stud 60 has an enlarged head 62 that is engaged in snap-fit fashion within an undercut recess 64 in an opposed end of the other pig 14, in this case the trailing end of the second pig 14B. This stud and recess arrangement could, of course, be reversed if desired.

The resilient snap-fit engagement of the head 62 of the stud 60 in the recess 64 prevents the second and third pigs 14B, 14C from inadvertently sliding apart within the surrounding body 12 of the pig launcher. It also allows fluid pressure to build in the chamber 28B between them on launching the second pig 14B. When the fluid pressure in the chamber 28B overcomes the retaining force of the snap-fit engagement, the fluid pressure is high enough to launch the second pig 14B quickly and reliably along the tubular body 12. Similar retaining arrangements can be provided between any neighbouring pairs of pigs 14, such as between the first and second pigs 14A, 14B, and indeed between the end cap 18 and whichever pig 14 is nearest to the end cap 18.

Other variations are possible within the inventive concept. For example, the skilled reader will appreciate how the first embodiment could be adapted to provide for more than two pigs. For example, a first pig of a set of three pigs could be launched by fluid overpressure exerted through a first pipe extending from a first inlet of the end cap through second and third pigs of the set and into a first chamber between the first and second pigs. The second pig could be launched by fluid overpressure exerted through a second pipe, parallel to the first pipe, extending from a second inlet of the end cap through the third pig and into a second chamber, in this case defined between the second and third pigs. Finally, the third pig could be launched by fluid overpressure exerted through a third inlet of the end cap communicating directly with a third chamber between the third pig and the end cap.

In the above variant of the first embodiment, the second pig would need one bore to accommodate the first pipe and the third pig would need two parallel bores to accommodate the first and second pipes. Each of those bores could be provided with seals and a pig valve system as described above. Each of the three inlets would have its own respective valve to control fluid flow through those inlets independently.

In other variants, the manifold and/or the associated valves may be disposed within the tubular body, most conveniently in the chamber between the end cap and the nearest pig. Thus, the body, or the end cap defining the closed end of the body, could be penetrated by a single opening though which fluid flows to be divided within the body between inlets that communicate with respective chambers.

The invention claimed is:

1. A pipeline pig launching device, comprising:
a tubular body that accommodates a set of pipeline pigs arranged in series such that respective chambers are defined within the body in which to apply launch pressure behind each pig with respect to a launch direction, the body having an open end through which pigs of the set may be launched in succession and a closed end opposed to the open end;
a fluid inlet communicating with one of said chambers defined between the closed end and a pig of the set nearest to that closed end; and
a passageway that communicates with another fluid inlet, that passageway extending through at least one pig of the set to at least one of said chambers defined between successive pigs of the set.

2. The pig launching device of claim 1, wherein the fluid inlets penetrate at wall of the body.

3. The pig launching device of claim 1, wherein the fluid inlets are in the closed end of the body.

4. The pig launching device of any claim 1, wherein each fluid inlet has a respective individually-controllable valve for controlling fluid flow through that inlet.

5. The pig launching device of claim 1, wherein the closed end of the body is defined by a closure that is movable or removable for loading the set of pigs into the body.

6. The pig launching device of claim 1, wherein the passageway is defined by a tubular member that extends from the fluid inlet through a bore that penetrates at least one pig of the set longitudinally.

7. The pig launching device of claim 6, comprising at least one valve element that is arranged to be held in an open state by the tubular member and to move into a closed state to close the bore on disengagement of the pig from the tubular member.

8. The pig launching device of claim 7, wherein when in the closed state, the at least one valve element closes an end of the bore.

9. The pig launching device of claim 6, wherein the bore is a sliding fit around the tubular member.

10. The pig launching device of claim 9 and having at least one sliding seal acting between the bore and the tubular member.

11. The pig launching device of claim 1, wherein the passageway comprises at least two conduit parts, at least one of those parts extending through a pig of the set and being separable from another conduit part upon launching that pig.

12. The pig launching device of claim 11, wherein the passageway comprises a valve arranged to be held open by engagement of the conduit parts and to close on disengagement of the conduit parts, to close the passageway on separation of the conduit parts.

13. The pig launching device of claim 1, wherein a movable valve element of a pig of the set is engageable to be held in an open state by a holding element of a neighboring pig of the set.

14. The pig launching device of claim 1, further comprising at least one retaining element extending between successive pigs of the set to act in tension between those pigs.

15. The pig launching device of claim 14, wherein the retaining element, or its connection to at least one of the successive pigs, is breakable in response to the application of launch pressure to a chamber defined between those pigs.

16. The pig launching device of claim 1, wherein the passageway comprises a pressure-responsive valve that is arranged to be in an open state under launch pressure to permit fluid flow through the passageway and to be in a closed state under operational pressure of a pig to block fluid flow through the passageway.

17. The pig launching device of claim 1, comprising a further passageway that communicates with a respective further fluid inlet, the further passageway extending through at least two pigs of the set to at least one of said chambers defined between successive pigs of the set.

18. A method of launching pipeline pigs from a set of such pigs arranged in series within a tubular body, having a closed end and an open end through which pigs of the set may be launched in succession, such that respective chambers are defined within the body in which to apply launch pressure behind each pig with respect to a launch direction, the method comprising:
applying launch pressure to at least one of the pigs by introducing fluid through a fluid inlet and from that inlet through at least one other pig of the set to at least one of said chambers between successive pigs of the set; and
applying launch pressure to a pig of the set nearest to the closed end by introducing fluid through another fluid inlet into one of said chambers between that pig and the closed end of the body.

19. The method of claim 18, comprising introducing fluid into the body through the fluid inlets.

20. The method of claim 18, comprising controlling fluid flow through each inlet independently.

21. The method of claim 18, comprising introducing fluid to a chamber between successive pigs via a tubular member extending along a bore through a pig.

22. The method of claim 21, comprising using the tubular member to hold open a valve element that is capable of closing the bore through said pig.

23. The method of claim 22, comprising allowing the valve element to close the bore through said pig upon disengaging that pig from the tubular member.

24. The method of claim 18, comprising introducing fluid to a chamber between successive pigs via a passageway that comprises at least two conduit parts, at least one of those conduit parts separating from another conduit part upon launching a pig.

25. The method of claim 24, comprising holding open a valve in the passageway by virtue of mutual engagement of the conduit parts and allowing that valve to close the passageway on mutual separation of the conduit parts.

26. The method of claim 18, further comprising applying retaining force between opposed ends of successive pigs of the set.

27. The method of claim 26, comprising overcoming the retaining force by increasing pressure in a chamber between the successive pigs.

* * * * *